United States Patent
Adachi

(10) Patent No.: US 7,020,607 B2
(45) Date of Patent: Mar. 28, 2006

(54) DIALOGUE PROCESSING SYSTEM AND METHOD

(75) Inventor: Akira Adachi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 566 days.

(21) Appl. No.: 09/739,644

(22) Filed: Dec. 20, 2000

(65) Prior Publication Data
US 2002/0038213 A1   Mar. 28, 2002

(30) Foreign Application Priority Data
Jul. 13, 2000   (JP)   ............................. 2000-212941

(51) Int. Cl.
*G10L 15/00* (2006.01)
(52) U.S. Cl. ........................................ 704/257; 704/10
(58) Field of Classification Search ................ 704/2, 704/5, 10, 257
See application file for complete search history.

(56) References Cited

U.S. PATENT DOCUMENTS

| | | | | |
|---|---|---|---|---|
| 4,833,611 A | * | 5/1989 | Fukumochi et al. | 704/5 |
| 5,181,163 A | * | 1/1993 | Nakajima et al. | 704/10 |
| 5,225,981 A | * | 7/1993 | Yokogawa | 704/2 |
| 5,357,596 A | * | 10/1994 | Takebayashi et al. | 704/275 |
| 5,457,768 A | * | 10/1995 | Tsuboi et al. | 704/231 |
| 5,787,414 A | * | 7/1998 | Miike et al. | 707/2 |
| 5,918,222 A | * | 6/1999 | Fukui et al. | 707/1 |
| 6,418,440 B1 | * | 7/2002 | Kuo et al. | 707/10 |
| 6,601,029 B1 | * | 7/2003 | Pickering | 704/257 |

FOREIGN PATENT DOCUMENTS

| | | |
|---|---|---|
| JP | 5-035430 | 2/1993 |
| JP | 5-061679 | 3/1993 |
| JP | 09-62739 | 3/1997 |

* cited by examiner

*Primary Examiner*—Daniel Abebe
(74) *Attorney, Agent, or Firm*—Staas & Halsey LLP

(57) ABSTRACT

An object of the present invention is to realize a natural dialogue with a system having a simple configuration. The dialogue processing system of the present invention to perform a dialogue with a user, comprises: a plurality of slots (slot 11), wherein each of the slots is a storage area storing a preset information item (for example, boarding date, departure point, destination, or flight name) that are required to achieve the purpose of the dialogue with the user (for example, an airline ticket reservation); an analyzer (the speech details analyzer 19) for extracting information corresponding to the information items from information (for example, free sentence entered in natural language) entered by the user in the dialogue and for storing the extracted information in the slot for that information item; and a response processor (the dialogue processor 21) for outputting response information (a sentence prompting the input of insufficient information) to the user in accordance with information storage state of the slots.

27 Claims, 11 Drawing Sheets

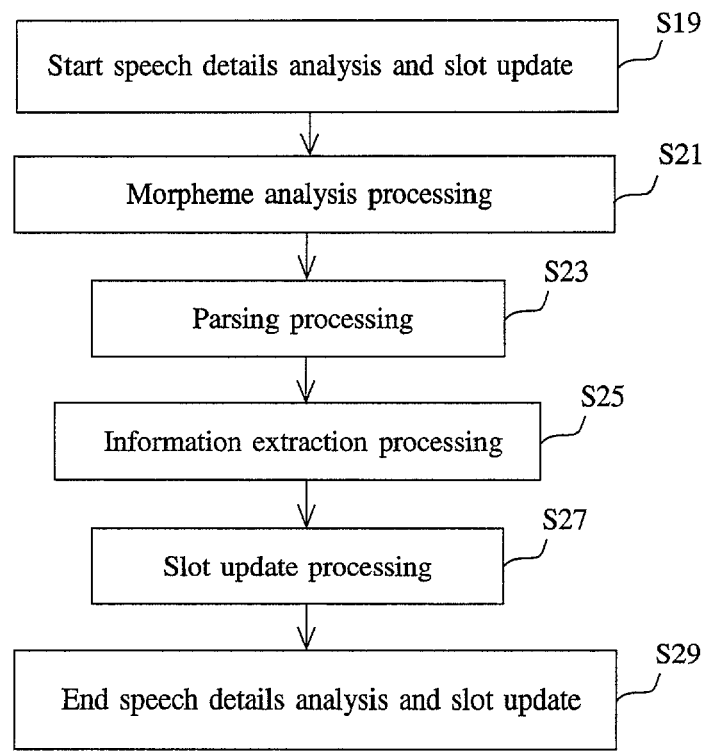
Fig.3
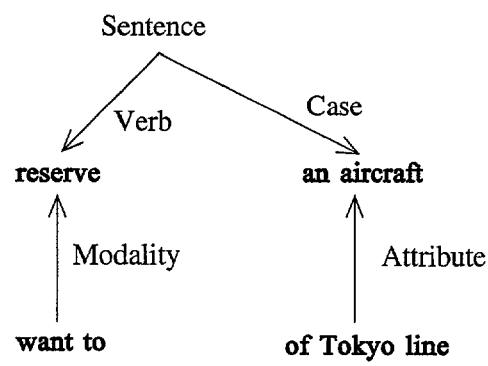
Fig.4A
Fig.4B

| Date | Time | Departure point | Destination | Flight name | Available seats |
|---|---|---|---|---|---|
| 6/5 | 10:00 | Haneda | Fukuoka | 123 | 10 |
| 6/5 | 10:00 | Haneda | Osaka | 234 | 5 |
| 6/5 | 10:10 | Haneda | Sapporo | 456 | 20 |
| 6/5 | 12:00 | Haneda | Fukuoka | 124 | 80 |
| ⋮ | | | | | |
| 6/5 | 18:30 | Haneda | Fukuoka | 128 | 120 |

Fig.11

| Slot status | | | | Response |
|---|---|---|---|---|
| Date | Flight name | Departure point | Destination | |
| × | × | × | × | Please specify the flight you would like to board. |
| ○ | × | × | × | Please specify your departure point. |
| ○ | ○ | × | × | Please specify your departure point and your destination. |
| ⋮ | ⋮ | ⋮ | ⋮ | ⋮ |
| ○ | × | × | ○ | Please specify your departure point . |
| ⋮ | ⋮ | ⋮ | ⋮ | ⋮ |
| ○ | ○ | ○ | ○ | Thank you for your reservation. |

Fig.12

| Source of speech | Dialogue contents | Date | Flight name | Departure point | Destination | Notes |
|---|---|---|---|---|---|---|
| Speaker | I would like to make a flight reservation. | — | — | — | — | First speech |
| Dialogue system | Please specify the flight you would like to board. | × | × | × | × | |
| Speaker | I would like to go to Fukuoka on June 6. | ○ | — | — | ○ | |
| Dialogue system | Please specify your departure point. | ○ | × | × | ○ | |
| Speaker | I would like a flight leaving Tokyo in the morning. | ○ | — | ○ | ○ | |
| Knowledge base | There is an 11am flight. | ○ | 11AM | ○ | ○ | Reply from knowledge base |
| Dialogue system | That will be fine. | ○ | ○ | ○ | ○ | |
| Speaker | Thank you very much. | ○ | ○ | ○ | ○ | |
| Dialogue system | | ○ | ○ | ○ | ○ | End of the dialogue |

Fig.13

| Source of speech | Dialogue contents | Date | Flight name | Departure point | Destinaton | Notes |
|---|---|---|---|---|---|---|
| Speaker | I would like to make a flight reeservation. | — | — | — | — | First speech |
| Dialogue | Please specify the flight you would like to board. | × | × | — | × | |
| Speaker | I would like to go to Fukuoka. | — | — | — | ○ | |
| Dialogue system | When would you like to board the flight? | × | × | × | ○ | |
| Speaker | Tomorrow morning, please. | Tomorrow | × | × | ○ | |
| Extraction rule | (Tomorrow←(Today:7TH)+1) | ○ | × | × | ○ | |
| Dialogue system | Please specify your departure point. | ○ | × | × | ○ | |
| Speaker | I would like a flight leaving from Tokyo. | ○ | (In the morning) | ○ | ○ | "In the morning" is stored temporarily |
| Knowledge base | | ○ | 11AM | ○ | ○ | Reply from knowledge base |
| Dialogue system | There is a flight at 11 o'clock. | ○ | ○ | ○ | ○ | |
| Speaker | That will be fine. | ○ | ○ | ○ | ○ | |
| Dialogue system | Tank you very much. | ○ | ○ | ○ | ○ | End of the dialogue |

Fig.14

DIALOGUE PROCESSING SYSTEM AND METHOD

TECHNICAL FIELD OF THE INVENTION

The present invention relates to a dialogue processing technology for performing a dialogue with a user and for collecting any required information through the dialogue.

BACKGROUND OF THE INVENTION

A dialogue generally refers to the exchange of information. People generally use language to exchange information. Use of their voice by a person will cause the hearing sense of another person to be activated and thus information is transferred. People can also specify information on media such as paper and display device using various other means. Information is thus transferred when the sight sense of others is activated. Dialogue between people and computers or the like is very common. Computers with functions to enable such dialogue are called dialogue systems or dialogue processing systems. If the word "dialogue" is used in this patent application, it includes exchanges with computers using both the hearing and the sight senses.

In the exchange of information using language, since all required information is not necessarily included in one speech (sentence), a number of exchanges are generally required before all necessary information is acquired. In conventional dialogue systems, information is acquired using a computer led method whereby a person responds to questions asked by the computer. Therefore, the flow of the dialogue is described in advance in the system as rules. In other words, conventional dialogue systems use a flowchart model that requests the speaker to enter information using a predetermined procedure. In yet another way of looking at it, the conventional methods relate to a processing method in which the recipient of the information, that is the computer, requests the speaker to enter information.

In contrast, dialogues between people cause the recipient of the information to change the behavior in accordance with the contents of the speech by the speaker. Such dialogues are therefore different to dialogues in conventional dialogue systems. Any attempts to tackle speaker led dialogue in these conventional dialogue systems necessitates the prediction of all dialogue patterns, and therefore the predication has to be performed factorial times of conditions necessary to establish a dialogue.

In Japanese Patent Application Laid-open No. 9-62739, art such as the following is disclosed. That is, in a city office, if a citizen enters their request using natural language into a device for allocating clerks at the window, the device for allocating clerks extracts keywords from the requests entered and calculates the degrees of the relationship with clerk terminals from the keywords entered. If a clerk terminal has a relationship degree higher than that of a predetermined threshold value, the device for allocating clerks connects to that clerk terminal. On the other hand, if such a clerk terminal does not exist, a vague response saying, "We cannot find a suitable clerk. Please provide more details," is returned to the citizen.

SUMMARY OF THE INVENTION

As described in the above, for conventional dialogue systems it was practically difficult to carry out a person-led dialogue, or it was impossible to carry out a natural dialogue as exchanged between persons.

Therefore, an object of the present invention is to provide dialogue processing technology that enables natural dialogue with a simple configuration.

The dialogue processing system of the present invention to perform a dialogue with a user, comprises: a plurality of slots (for example, slot 11 in the embodiment), wherein each of the slots is a storage area storing a preset information item (for example, boarding date, departure point, destination, or flight name) that are required to achieve the purpose of the dialogue with the user (for example, an airline ticket reservation); an analyzer (for example, the speech details analyzer 19 in the embodiment) for extracting information corresponding to the information items from information (for example, free sentence entered in natural language) entered by the user in the dialogue and for storing the extracted information in the slot for that information item; and a response processor (for example, the dialogue processor 21 in the embodiment) for outputting response information (for example, a sentence prompting the entry of insufficient information) to the user in accordance with information storage state of the slots (for example, the status representing what slots are filled and the contents of stored information).

This enables a simple configuration to achieve natural dialogue and allows effective acquisition of required information.

BRIEF DESCRIPTION OF THE DRAWINGS

FIG. 3 is a flowchart for speech details analysis and slot update processing in the dialogue system in the preferred embodiment of the present invention;

FIG. 4A is a diagram to explain a specific example of morpheme analysis and parsing;

FIG. 4B is a case analysis graph in case of FIG. 4A;

FIG. 11 is a diagram to explain a table that relates to the knowledge base in the preferred embodiment of the present invention;

FIG. 12 shows an example of a response table in the preferred embodiment of the present invention;

FIG. 13 is a diagram to explain the dialogue contents and internal status of the dialogue system in a specific example; and FIG. 14 is a diagram to explain the dialogue contents and internal status of the dialogue system in another example.

DESCRIPTION OF THE PREFERRED EMBODIMENTS

Firstly, the characteristics of dialogue that form the basis of the present invention, will be discussed. In a dialogue that is instituted for a specific purpose, a set of information required to establish the dialogue exists. Here, a dialogue with a specific purpose refers not to a dialogue with no specific purpose, such as a social dialogue, but to communication that is instituted for a specific reason. Also, in an airline reservation, the set of required information refers to information such as the departure point, the destination, and the flight name. There are few instances where all the information for the set of required information will be provided in one speech by the speaker. Rather, the required information is all provided through an exchange (negotiations) with the recipient. Therefore, a dialogue progresses through several repeated exchanges while situational information is omitted. Here, situational information refers to the details given in the immediately preceding dialogue and etc.

As described above, a flexible dialogue cannot be instituted if the context of a dialogue is not considered during the course of the dialogue. Here, the context refers to the following.

(1) Omission of Speech Contents Previously Discussed

To make dialogue more efficient, the speaker and recipient both use pronouns to refer to matters which are common knowledge to both parties, or they omit such information.

(2) One Piece of Information can Work to Supplement a Number of Pieces of Information In some cases, something said in one speech can supplement a number of pieces of information that have yet been dealt with. If supplementation processing is not introduced, unnecessary questions may be asked.

(3) The Sequence of a Dialogue Cannot be Predicted.

The sequence in which a speaker talks (communication order of the information) cannot be predicted and so the recipient must wait for all information.

An embodiment of the present invention that was conceived on the basis of these analyses will be described below in a more specific manner.

Figure 1:
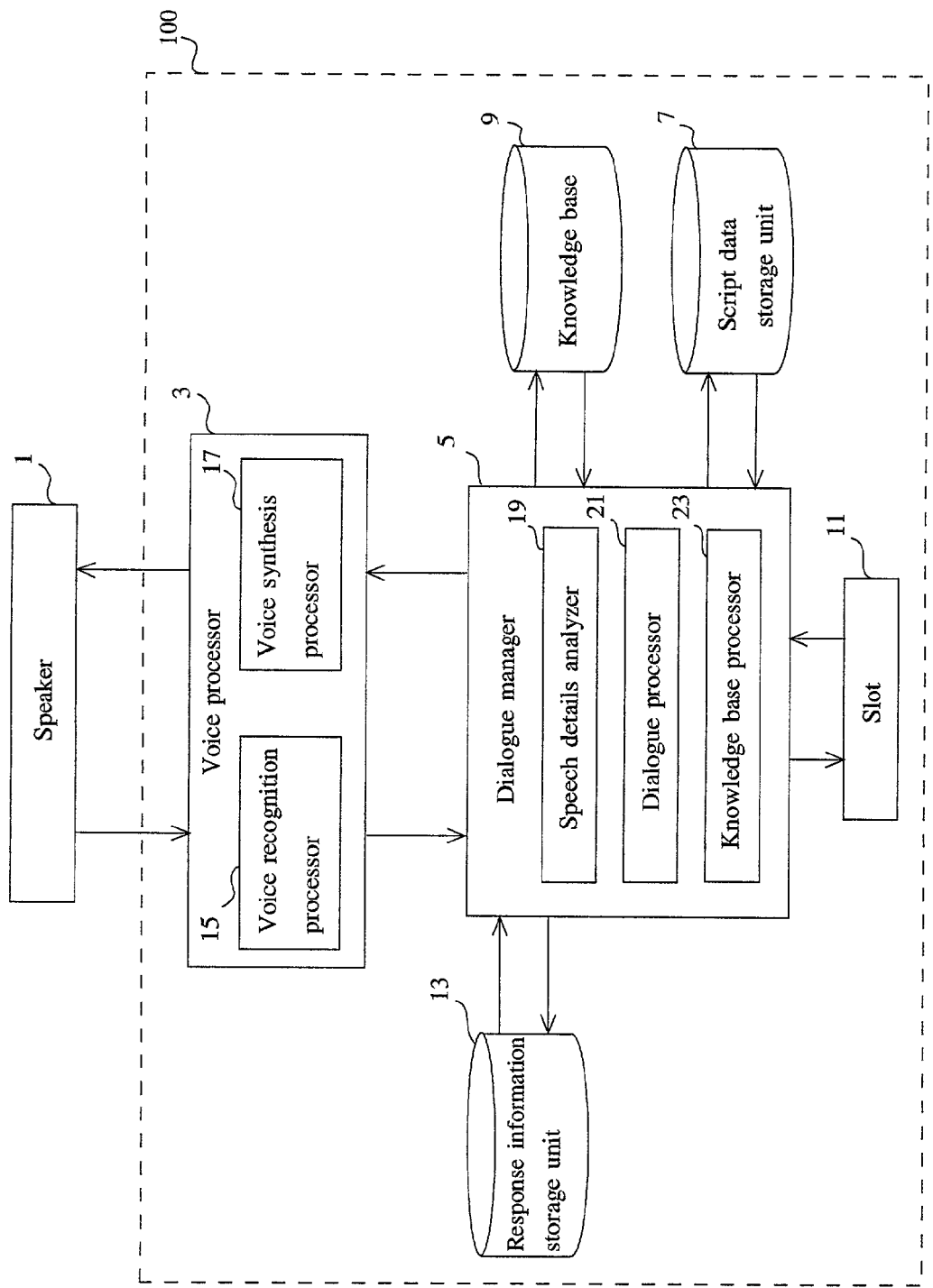
FIG. 1 is a diagram to explain an overview of the dialogue system in the preferred embodiment of the present invention.

FIG. 1 illustrates the configuration of a dialogue system in an embodiment of the present invention. This dialogue system 100 comprises a voice processor 3, a dialogue manager 5, a script data storage unit 7, a knowledge base 9, a slot 11, and a response information storage unit 13. The dialogue manager 5 is connected to the voice processor 3, the script data storage unit 7, the knowledge base 9, slot 11, and the response information storage unit 13 to allow exchange of information each other. The telephone used by the speaker 1 and the dialogue system 100 are connected, for example, by telephone lines. The addition to the dialogue system 100 of a microphone, speakers, and the circuit required to operate these, enables the speaker 1 to have a direct conversation with a device in which the dialogue system 100 is implemented.

The speaker 1 refers to the person that is conveying information to the dialogue system 100 in a dialogue. For example, in a dialogue system of an airline ticket reservation system, the person wishing to reserve an airline ticket is the speaker 1.

The voice processor 3 comprises a voice recognition processor 15 and a voice synthesis processor 17. The voice recognition processor 15 has a function for converting voice information entered using the voice into character strings and for outputting the character strings to the dialogue manager 5. The voice synthesis processor 17 has a function for converting character strings specified by the dialogue manager 5 into voice information and for outputting the voice information. The voice processor 3 is not required if information is input into, and output from a dialogue system 100 using character strings rather than the voice.

The dialogue manager 5 comprises a speech details analyzer 19, a dialogue processor 21, and a knowledge base processor 23. The dialogue manager 5 operates together with the script data storage unit 7, the knowledge base 9, the slot 11, and the response information storage unit 13, and has a function for indicating response information prompting the speaker 1 to enter required information and for acquiring the information required to achieve the aim of the dialogue. The speech details analyzer 19 has a function for extracting the required information from the speech information entered by the speaker 1 and for recording that extracted information into slot 11. The dialogue processor 21 has a function for acquiring response information for prompting the user to enter any information not already acquired, from the response information storage unit 13 based on information recorded in slot 11, and for outputting that acquired response information to the voice processor 3 to speak the response information to the speaker 1. The knowledge base processor 23 has a function for analyzing the knowledge base 9 and has a function for updating the information in slot 11 and for updating the knowledge base 9 itself.

The script data storage unit 7 stores the script data that defines part of the processing in the dialogue manager 5, for example, processing to compare the information recorded in slot 11 with the information in the knowledge base 9.

The knowledge base 9 is a database that stores knowledge relating to the aim of the dialogue. For example, in an airline ticket reservation system, it stores information relating to flight schedules and reservations. More specifically, it stores information relating to the flights, such as departure points, destinations, departure times, and arrival times and information on seats available for each flight.

The items of the information required to achieve the aim of the dialogue are preset to slot 11 and slot 11 has storage areas that respectively correspond to these items of the information. By referring to these storage areas, the systems is able to grasp the state of the dialogue and is able to determine whether or not there is any other information required to achieve the aim of the dialogue. Each storage area is also called a slot.

The responses given to speaker 1 are stored in the response information storage unit 13. These responses are, specifically, sentence structure patterns, that is templates. The responses that prompt the speaker 1 to enter the information required to achieve the purpose of the dialogue are stored in accordance with the state of slot 11. The response information stored in this response information storage unit 13 can be stored as voice information or as character strings.

Figure 2:
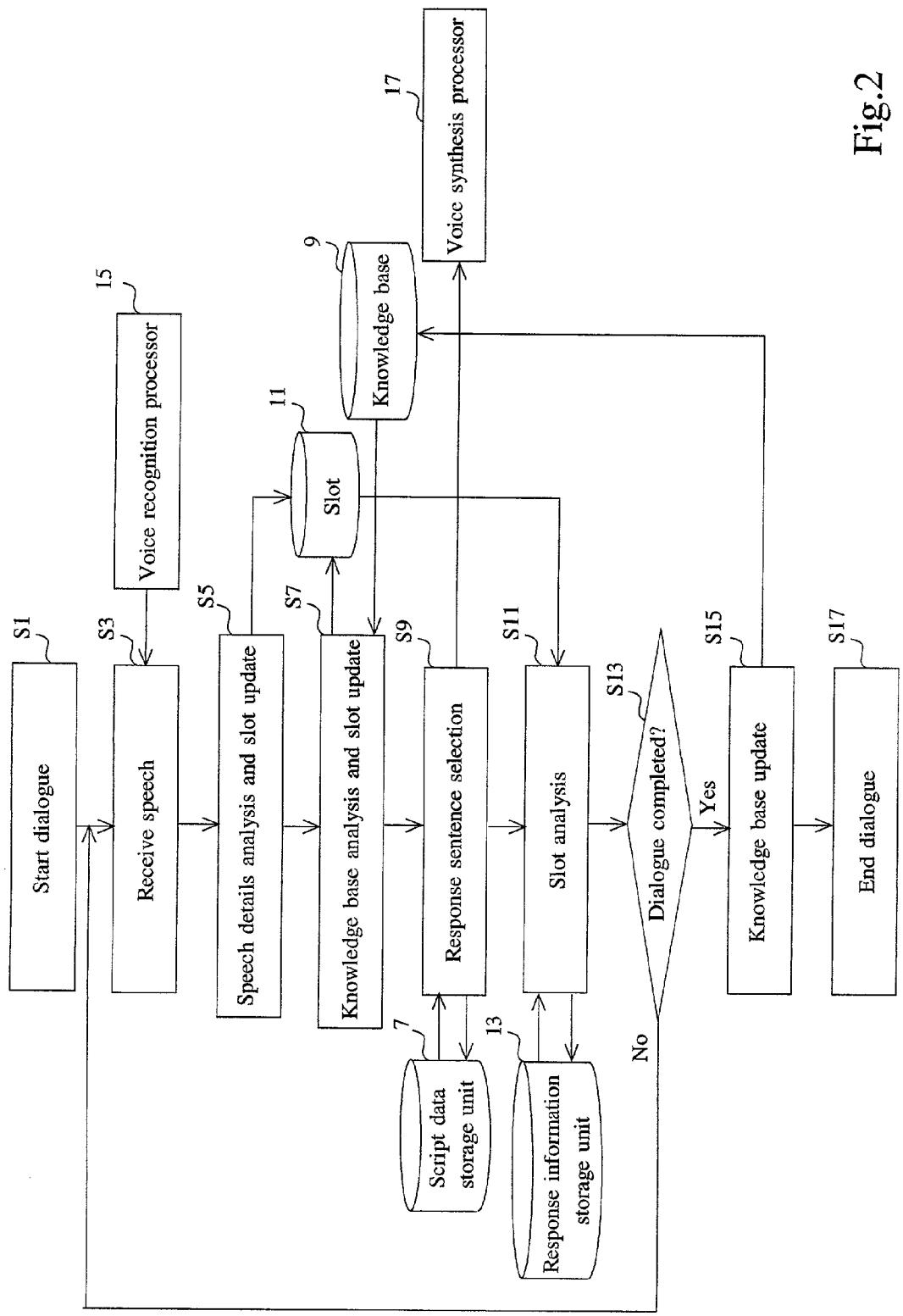
FIG. 2 is a flowchart showing the flow of whole processing in the dialogue system in the preferred embodiment of the present invention.

Next, the processing that takes place in the dialogue system 100 in the embodiment of the present invention will be explained. FIG. 2 is a flowchart that shows the flow of whole processing that takes place in the dialogue system 100 in the embodiment of the present invention.

The speaker 1, by telephoning a telephone number allocated to the dialogue system 100, starts a dialogue with the dialogue system 100 (step S1). For example, if this dialogue system 100 is used in an airline ticket reservation system, a message saying, "Welcome. How can we help you?" will be sent to the speaker via the telephone line from the dialogue system 100. To enable this type of message to be sent from the dialogue system 100, the dialogue processor 21 selects the above response from the responses stored in the response information storage unit 13 as the message to be communicated at the beginning of a dialogue. The dialogue manager 5 communicates this selected response to the voice synthesis processor 17. The voice synthesis processor 17 converts the response sentence made from character string information into voice information. The converted voice information is then sent to the telephone of speaker 1 via telephone lines and that message is delivered to the speaker.

If, for example, in response to this the speaker 1 says on the telephone, "I would like to make a reservation on a flight to Haneda," that voice information is sent to the voice processor 3. The voice recognition processor 15 in the voice processor 3 uses well-known voice recognition processing to convert this voice information into character string information. This character string information is then entered into the dialogue manager 5 (step S3).

The speaker details analyzer 19 analyzes the contents of the speech and performs slot update processing (step S5). That is, for the character string information entered into dialogue manager 5, morpheme analysis, parsing, information extraction, and slot update processing are performed to extract the necessary information from the entered character string information. The processing involved in this step is explained later.

After analysis of the speech contents, the knowledge base processor 23 executes knowledge base analysis and slot update processing (step S7). Here, for example, the information recorded in slot 11 is compared with the information in the knowledge base 9 based on the script data stored in the script data storage unit 7. The processing involved in this step is explained later.

Next, based on information in the updated slot 11 (step S9), the dialogue processor 21 selects a corresponding response sentence from the response stored in the response information storage unit 13. The dialogue processor 21 delivers information relating to the selected response to the voice synthesis processor 17. The information delivered to the voice synthesis processor 17 is converted into voice information and sent to the telephone of speaker 1 via the telephone line. In this way, the speaker 1 listens to the response from the dialogue system 100.

Analysis of slot 11 is then executed in the dialogue processor 21 (step S11). The analysis of slot 11 is executed from at least two viewpoints. Firstly, slot 11 is analyzed to see whether or not the information required to achieve the aim of the dialogue has been acquired. In the example of the airline ticket reservation, this analysis determines whether or not information relating to the boarding date and flight name that is required for the reservation has been acquired. If it is judged that the information required to achieve the aim of the dialogue has not all been acquired and that the dialogue is not complete (step S13), the dialogue processor 21 waits for the speaker to speak again (step S3).

If the dialogue processor 21 judges that it acquires the information required to achieve the aim of the dialogue and that the dialogue is complete (step S13), it uses the knowledge base processor 23 to update the knowledge base 9 (step S15). This is the second viewpoint from which analysis takes place, that is analysis of whether or not the knowledge base 9 needs to be updated. In the example of the airline ticket reservation, the dialogue processor 21 judges that it acquires the information required for an airline ticket reservation from the speaker 1, and the confirmation of the reservation is acquired from the speaker 1, based on the analysis of the slot 11, the knowledge base processor 23 updates the reservation information in knowledge base 9 to reflect the information relating to the speaker's reservation to the knowledge base 9. In addition, the available seat information is updated to reduce the number of available seats by the number just reserved. This ends the processing for the dialogue with the speaker (step S17). The knowledge base 9 is updated in accordance with the aim of the dialogue. In other words, if the aim of the dialogue is a reservation, it reduces the number of available seats. If the purpose of the dialogue is to cancel a reservation, it increases the number of available seats.

Next, speech details analysis and slot update processing (step S5 in FIG. 2) will be explained in detail. FIG. 3 is a flowchart that shows the flow of processing involved in speech details analysis and slot updates. FIGS. 4A and 4B show a specific example for explaining the processing involved in speech details analysis. In FIG. 4A, the arrows show the direction in which a word is subordinate.

As explained using FIG. 2, speech details analysis and slot update processing starts after voice information is received from the speaker 1 via telephone lines and is converted to character string information by the voice recognition processor 15 (step S19). This speech details analysis and slot update processing is executed in the speech details analyzer 19 of the dialogue manager 5. In this processing, morpheme analysis is the first processing to be executed (step S21). Morpheme analysis processing refers to processing that separates the input sentence into morphemes. In English, the boundary between words is clear but there is great ambiguity in some words (for example, like) that are written the same. Therefore, the analysis of the parts of speech of morphemes is main processing. In the example shown in FIG. 4A, "I want to reserve an aircraft of Tokyo line," the sentence is divided up as, "I/want to/reserve/an aircraft/of Tokyo line." Here, "/" indicates the separation between morphemes.

Next, syntax analysis (parsing) processing is executed (step S23). Parsing processing refers to processing that generates syntax information from the results of morpheme analysis. In English, grammatical restrictions such as the positional relationship between words and parts of speech are used to analysis what relates to what. In the example in FIG. 4A, parsing shows that "I" relates to "want to", "want to" relates to "reserve", "an aircraft" relates to "reserve" and "of Tokyo line" relates to "an aircraft". As the case element, the main predicate "reserve" strongly seeks the object. Therefore, the object of "reserve" can be interpreted as that which is to be reserved. Simultaneously, "of Tokyo", which links to "an aircraft" to modify it, is used as an attribute of the object.

Information extraction processing (step S25) is executed after parsing (step S23). This information extraction processing extracts the necessary information from the results of parsing. In English, the information of the case (obligatory case) that the verb, which is the main predicate, seeks can be used. The information that indicates what case is required by a verb is already described in the dictionary. By referring to the morpheme relationships found in parsing and to obligatory case information assists in calculating the case relationship between nominal clauses that relate to the verb. For example, the fact that, "The verb 'reserve' requires an object as a case," is defined with the expression, Verb (reserve)=Case(object). FIG. 4A is, for example, converted into a case analysis graph as shown in FIG. 4B. From this, we can see that the object of "reserve" is "an aircraft" and its attribute is "of Tokyo line". If case prepositions such as to, at, in, and on are used, the information which is represented on the surface is used to extract time and place etc.

Information extraction processing (step S25) will be explained further below. Knowledge called extraction rules is used to extract information. This knowledge is constructed using language characteristics that appear in sentences and are processing objects. Here, as an extraction rule that extracts information from its relationship with a verb, a rule used if a call omits a case preposition is omitted in the speech is shown below. In addition, the surface information is used to extract information relating to time and etc., for example. The codes used in the following example are "Morph", which refers to a morpheme, "Next", which refers to the next morpheme, and "Object", which refers to an object word. Accordingly, Morph (reserve)=TRUE means that the morpheme is "reserve".

An example of an extraction rule using the relationship with a verb is given below.

TABLE 1 if (Morph(reserve) = TRUE & Object(Morph(reserve)) = LOCATION)
    Slot(Location | arrival) ← Object(Morph(reserve))
Endif This extraction rule shows that if the morpheme is "reserve" and the object for "reserve" is a word that expresses a location, information for the object of "reserve" is stored in the destination area in slot 11.

An example of an extraction rule that uses the surface information is shown below.

TABLE 2 if (Morph(January) = TRUE)
    Slot(Month) ← 1
elseif (Morph(February) = TRUE)
    Slot(Month) ← 2
elseif (Morph(March) = TRUE)
    Slot(Month) ← 3
elseif (Morph(April) = TRUE)
    Slot(Month) ← 4
elseif (Morph(May) = TRUE)
    Slot(Month) ← 5
elseif (Morph(June) = TRUE)
    Slot(Month) ← 6
elseif (Morph(July) = TRUE)
    Slot(Month) ← 7
elseif (Morph(August) = TRUE)
    Slot(Month) ← 8
elseif (Morph(September) = TRUE)
    Slot(Month) ← 9
elseif (Morph(October) = TRUE)
    Slot(Month) ← 10
elseif (Morph(November) = TRUE)
    Slot(Month) ← 11
elseif (Morph(December) = TRUE)
endif This extraction rule shows that if the morpheme is a word that expresses a month between January and December, the corresponding number from 1 to 12 is stored in the month storage area in the slot 11.

An example of an extraction rule relating to destination is shown below.

TABLE 3 if (Next(Morph(from)) = LOCATION)
    Slot(Location | departure) ← Next(Morph(from))
elseif(Next(Morph(to)) = LOCATION)
    Slot(Location | arrival) = Next(Morph(to))
endif This extraction rule shows that if the morpheme is "from" and the word following "from" is a location, then the word following "from" will be stored in the departure point storage area of the slot 11. Also, if the morpheme is "to" and the word following "to" is a location, then the word following "to" will be stored in the destination storage area of the slot 11.

Information is thus extracted (step S25) and slot 11 is updated (step S27).

Figure 5:
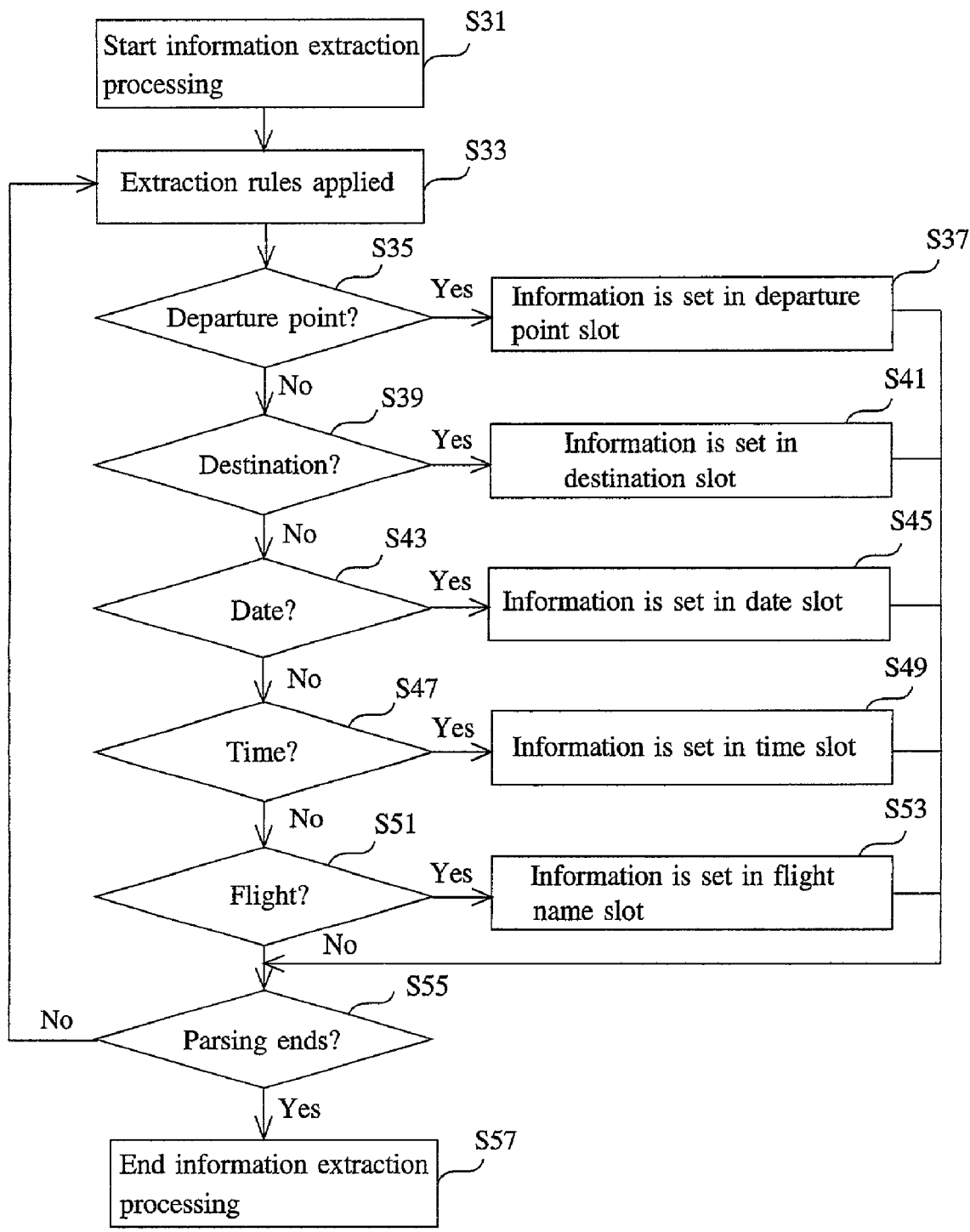
FIG. 5 is a flowchart for information extraction processing in the dialogue system in the preferred embodiment of the present invention.

The flow of processing involved in information extraction (step S25) will be further explained using the flowchart shown in FIG. 5. After parsing processing, the speech details analyzer 19 starts information extraction (step S31). Lastly, the speech details analyzer 19 applies the above types of extraction rules and executes processing (step S33). The analyzer determines whether or not the extracted information relates to the departure point (step S35). If it does relate to the departure point, the speech details analyzer 19 sets that information in the departure point storage area in slot 11 (step S37). If the information does not relate to the departure point, the analyzer 19 determines whether or not it relates to the destination (step S39). If it does relate to the destination, the analyzer 19 sets the information in the destination storage area in slot 11 (step S41).

If the extracted information does not relate to the destination, the analyzer 19 determines whether or not it relates to the date (step S43). If the information does relate to the date, the analyzer 19 sets it into the date storage area in slot 11 (step S45). If the information does not relate to the date, the analyzer 19 determines whether or not it relates to the time (step S47). If it does relate to the time, the analyzer 19 sets it in the time storage area (step S49). If the extracted information does not relate to time, the analyzer 19 determines whether or not it relates to the flight name (step S51). If it does relate to the flight name, the analyzer 19 sets it in the flight name storage area in slot 11 (step S53). If it does not relate to the flight name, the analyzer 19 determines whether or not the extracted information indicates the end of the syntax (parsing) information that should be analyzed (step S55). If it is not the end of the syntax information, the analyzer 19 applies the extraction rules again to repeat the above processing (step S33). If it is the end of the syntax information, information extraction ends (step S57).

Information extraction and slot update processing is thus executed and processing ends (FIG. 3: step S29).

Figure 6:
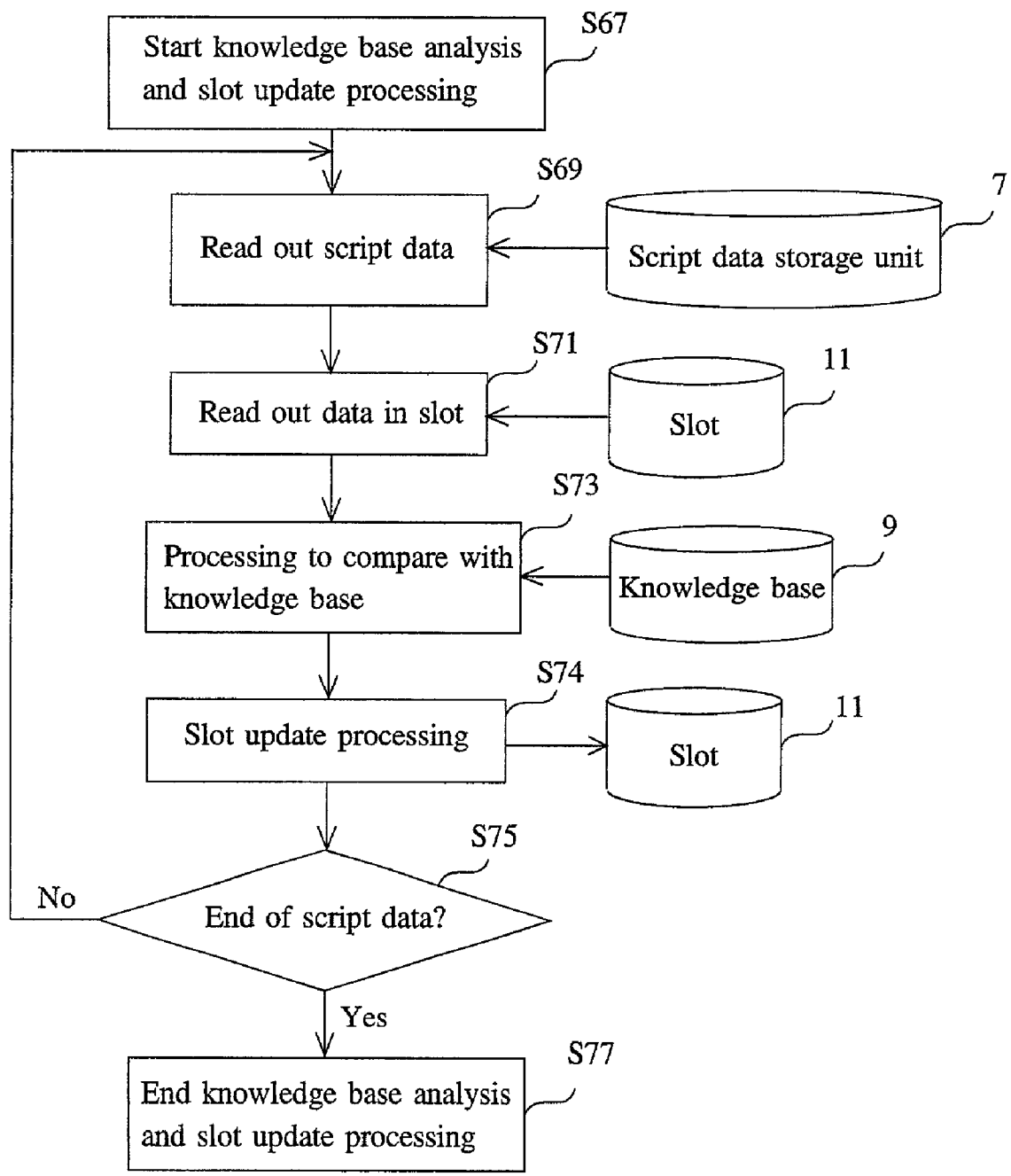
FIG. 6 is a flowchart for knowledge base analysis and slot update processing in the dialogue system in the preferred embodiment of the present invention.

Next, details of knowledge base analysis and slot update (step S7 in FIG. 2) will be explained. FIG. 6 is a flowchart that shows the flow of processing involved in knowledge base analysis and slot update processing.

In FIG. 6, processing of knowledge base analysis and slot update starts by the knowledge base processor 23 after processing of speech details analysis and slot update (step S67). This knowledge base analysis and slot update processing includes processing to verify the conformity between information recorded in slot 11 and the actual situation and processing to supplement necessary information in accordance with the information recorded in slot 11 and the information stored in the knowledge base 9. Here, in the example of the flight reservation, the actual situation refers to the flight schedules and reservation status. Firstly, script data is read from the script data storage unit 7 to compare the information in the knowledge base 9 with that in the slot 11 (step S69).

Next, information stored in the predetermined area of the slot 11 through speech details analysis and slot update processing (step S5 in FIG. 2) is read out (step S71). The knowledge base processor 23 uses the script data read from the script data storage unit 7 to compare the information read from the slot 11 with the information in the knowledge base 9 (step S73). The slot will be updated as necessary depending on the results of the comparison (step S74). If the processing relating to the script data has not ended (step S75), script data will be read again from the script data storage unit 7 (step S69) and processing will continue as above. If the script data has ended (step S75), knowledge base analysis and slot update processing ends (step S77).

As an example of processing that is included in the knowledge base analysis and slot update processing, the processing that verifies whether or not any contradiction exist between the information set in the slot 11 and the information in the knowledge base 9 will be explained. The script for this verification will be explained using the example of the airline ticket reservation. To execute this script, the knowledge base 9 has a function for acquiring the "departure point" and "flight name" information stored in the slot 11 and for outputting TRUE if verification is successful and FALSE if there is a contradiction. An example of the script is given below.

TABLE 4 if(Knowledge(Slot(departure point) | Slot(flight name)) = FALSE)
    Slot(departure point) ← Not relevant
endif In this script, the "departure point" and "flight name" stored in the slot 11 are given to the knowledge base 9 and its return value is verified. If there is any contradiction in the "departure point" and "flight name", a code that indicates a contradiction, for example "not relevant" will be set in the departure point storage area in the slot 11 to update the slot 11. When the dialogue processor 21 selects a response from the response information storage unit 13, updating the slot 11 in this way causes a code indicating a contradiction in the slot 11 and enables the selection of a response that indicates that there is an inconsistency or an error in the speech contents by the speaker 1.

Next, processing included in the knowledge base analysis and slot update processing will be explained, that is for deriving further necessary information based on the information extracted from the speech details analyzer 19 and for storing the derived information in the predetermined storage area in the slot 11.

The script that derives the related information and stores it in the slot 11 will be explained, once again using the example of the airline ticket reservation. Reservations for an airplane can be made using departure point, destination, date, and time information but the flight name is information for which departure points, destination, and time attributes are uniquely set. In other words, by specifying the flight name, departure points, destinations, and times are also specified. Using this characteristic, if flight name information is extracted in the knowledge base analysis, processing to automatically supplement the destination slot, the departure point slot and time slot is executed. This type of knowledge base analysis and slot update processing can be used to reduce the number of questions that need be asked for the speaker 1.

It is also possible to use the departure point, destination, and time information to supplement the flight name information. Furthermore, if there is only one flight a day from a certain airport A to a certain airport B, information relating to the departure point and destination can be used to supplement the flight name. The script that executes such supplementary processing is called supplementary script.

Next, an example of this supplementary script will be explained. Firstly, the supplementary script that uses the knowledge base 9 to supplement information relating to departure point, destination and time if the date and flight name information have been able to be extracted, will be explained. The code "Knowledge" used in this supplementary script refers to the knowledge in the knowledge base 9.

TABLE 5 if (Slot (date) = TRUE & Slot (flight name) = TRUE)
    Slot (departure point) ← Knowledge (departure point | flight name)
    Slot (destination) ← Knowledge (destination | flight name)
    Slot (time) ← Knowledge (time | flight name)
endif If the date and flight name information are included in the slot 11, this supplementary script stores the departure information in the departure point storage area in the slot 11 (departure point slot) using the knowledge that links the flight name and departure points in knowledge base 9. In addition, it stores the destination information in the destination storage area of the slot 11 (destination area slot) using the knowledge that links the flight name and destination in the knowledge base 9. Furthermore, using the knowledge that links the flight name and time in knowledge base 9, the script stores the time information in the time storage area of the slot 11 (time slot). The date information is sometimes omitted because it is not essential for acquiring the departure point, destination, and time information. Such processing eliminates the need to ask the speaker questions relating to the departure point, destination, and time and thus enables more efficient and speedy acquisition of the information needed for an airline ticket reservation, which is the aim of the dialogue.

Next, an example of the supplementary script that executes the processing for providing flight names from the knowledge base 9 if the departure point, destination, and time information have been able to be extracted, will be explained.

TABLE 6 if (Slot (date) = TRUE & Slot (departure point) = TRUE & Slot (destination) = TRUE & Slot (time) = TRUE)
    Slot (flight) ← Knowledge (flight name | date, departure point, destination, time)
endif If the slot 11 includes date, departure point, destination, and time information, this supplementary script describes the processing for storing a flight name information in the flight name storage area of the slot 11 (flight slot) based on knowledge from the knowledge base 9 that links date, departure point, destination, and time information. Such processing eliminates the need to ask questions relating to the flight and thus enables more efficient and speedy acquisition of the information needed for an airline ticket reservation.

The next example is one of supplementary script that executes the processing for providing the flight name from information relating to a departure point and destination if there is only one flight per day from a certain airport A to a certain airport B.

TABLE 7 if (Slot (date) = TRUE & Slot (departure point) = TRUE & Slot (destination) = TRUE & Knowledge (candidates | date, departure point, destination) = 1)
    Slot (flight) ← Knowledge (flight name | date, departure point, destination)
endif If the slot 11 includes date, departure point, and destination information and if there is only one flight for the date, departure point, and destination provided, this supplementary script describes the processing for storing flight name information in the flight name storage area of the slot 11 based on the knowledge in the knowledge base 9 that links the date, departure points, and destinations. Such processing eliminates the need to ask the speaker 1 questions relating to the flight name and thus enables more efficient and speedy acquisition of the information needed for an airline ticket reservation, which is the aim of the dialogue.

Figure 7:
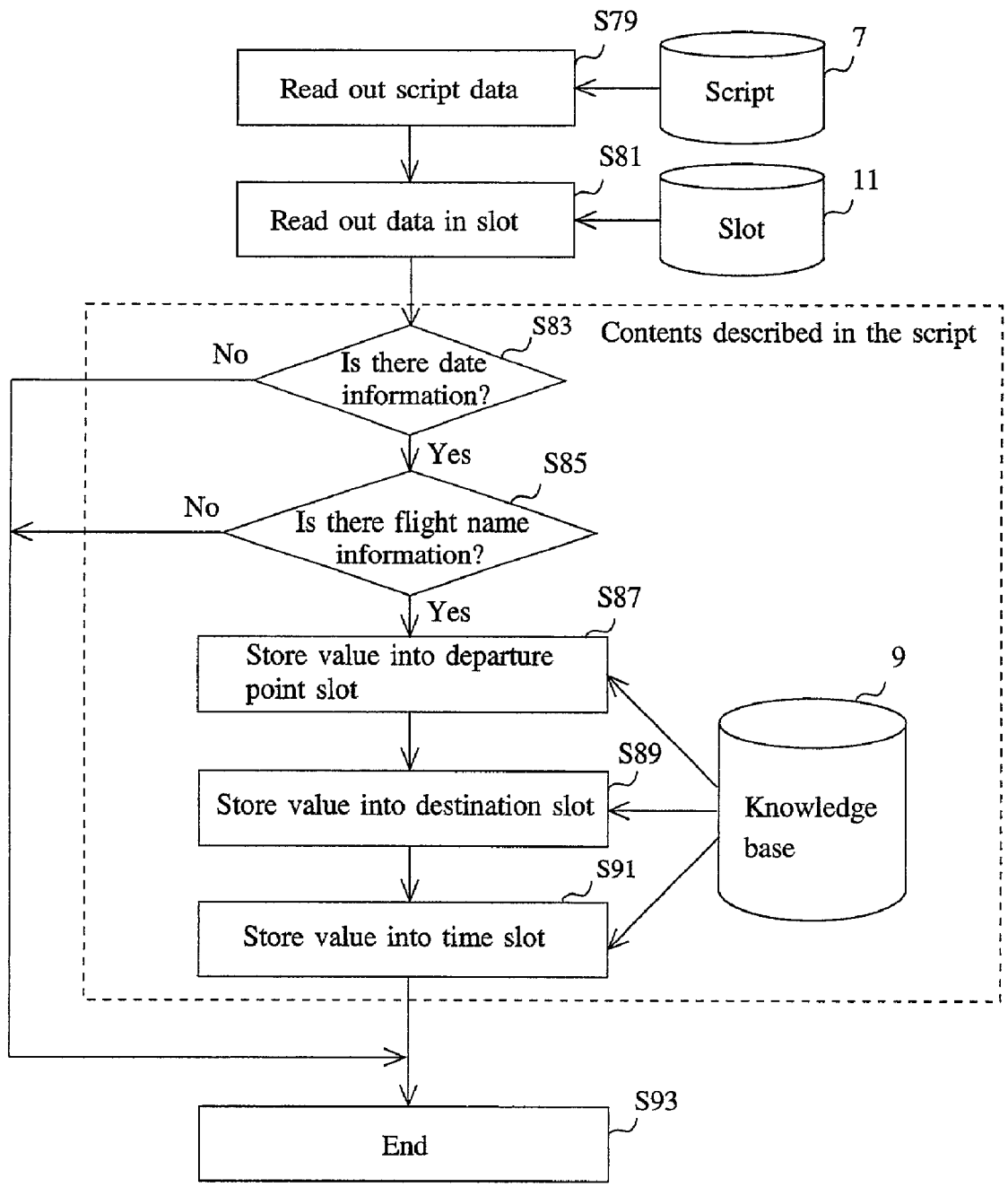
FIG. 7 is a flowchart showing a specific example of knowledge base analysis and slot update processing.

Next, a specific flow of processing involved in knowledge base analysis and slot update if a date and flight name have been specified will be explained using FIG. 7. First, the knowledge base processor 23 reads the script that supplement the departure points, destinations, and times if date and flight name information have been extracted, from the script data storage unit 7 (step S79). The processing enclosed by the dotted line in FIG. 7 is executed in accordance with the script description. Next, the knowledge base processor 23 reads information in the slot 11, that is the information extracted from the speech information that has been input by the speaker 1 (step S81). Note that the execution order of the steps S79 and S81 can be reversed. Later processing is then executed in accordance with the script read in step S79.

Whether or not date information is included in the information read from the slot 11 is determined by the knowledge base processor 23 in accordance with the script (step S83). Processing ends if date information is not included (step S93). If date information is included, whether or not flight name information is included in the read information is determined (step S85). Processing ends if flight name information is not included (step S93).

If flight name information is included, tables that link departure point, destination, and time information to the date and flight name information, stored in the knowledge base 9 is referred to, and the departure point, destination, and time information corresponding to this date and flight name information is read out. The read departure point information will be placed in the departure point slot (step S87). The destination information will be placed in the destination slot (step S89), and the time information read will be placed in the time slot (step S91). If this information has been placed in the slot 11, the sequence of knowledge base analysis and slot update processing will end. In this processing flow, which has been explained using FIG. 7, inclusion of date information was the prerequisite of knowledge base processing. However, if flight name information is included and departure point, destination, and time information can be acquired from the knowledge base 9 by the flight name information, date information is not essential.

Figure 8:
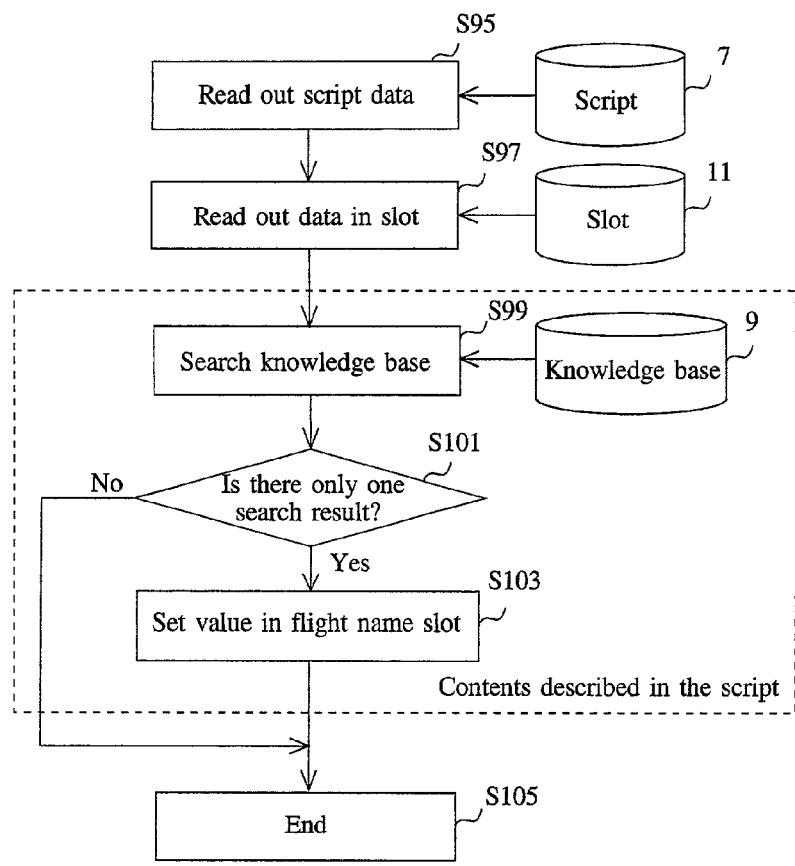
FIG. 8 is a flowchart showing a specific example of knowledge base analysis and slot update processing.

Next, FIG. 8 will be used to explain the specific flow of processing involved in knowledge base analysis and slot update if there is only one flight per day from a certain airport A to a certain airport B and if the flight name is supplemented from information relating to the departure point and destination. Firstly, the script stored in the script data storage unit 7 to supplement the flight name from information relating to the date, departure point, and destination is read out (step S95). The part of FIG. 8 enclosed by the dotted line is the part in which processing is executed in accordance with the script description. Next, the information recorded in the slot 11, that is the information extracted from the information entered by the speaker 1, is read out (step S97). Note that the execution order of the steps S95 and S97 can be reversed. Later processing is then executed in accordance with the script read in step S95.

A search is made for a flight name in the knowledge base 9 that satisfies the conditions based on the date, departure point, and destination information included in the information read from the slot 11 (step S99). If the result of the search shows that there is not one flight that satisfies these conditions (step S101), that is, if there are no flights or if there is a plurality of flights that satisfy these conditions, processing ends (step S105). On the other hand, if the search reveals that one flight satisfies the conditions, that flight name is stored in the flight slot of the slot 11 (step S103) and processing is ended.

In knowledge base analysis and slot update processing, the knowledge base 9 can be provided with a function for returning TRUE if a reservation is possible based on the "date" and "flight name" information and for returning FALSE if a reservation is not possible. A new slot called Slot (status) is provided. An example of script for this is given below.

TABLE 8 if (Knowledge (Slot (date) | Slot (flight)) = FALSE)
    Slot (status) ← Reservation impossible
endif By introducing a slot relating to "status", it is possible to set a response about the status of the knowledge base 9 for the contents of the slot 11 in the response information storage unit 13. Accordingly, if a number of people for which reservations can be made is given to this slot Slot (status), information saying, "There are 100 seats available." can be provided as a response. A template for a response would be configured as follows.

TABLE 9

There are "Slot (status)" seats available.
"" is a symbol that indicates the information stored in the slot.

Figure 9:
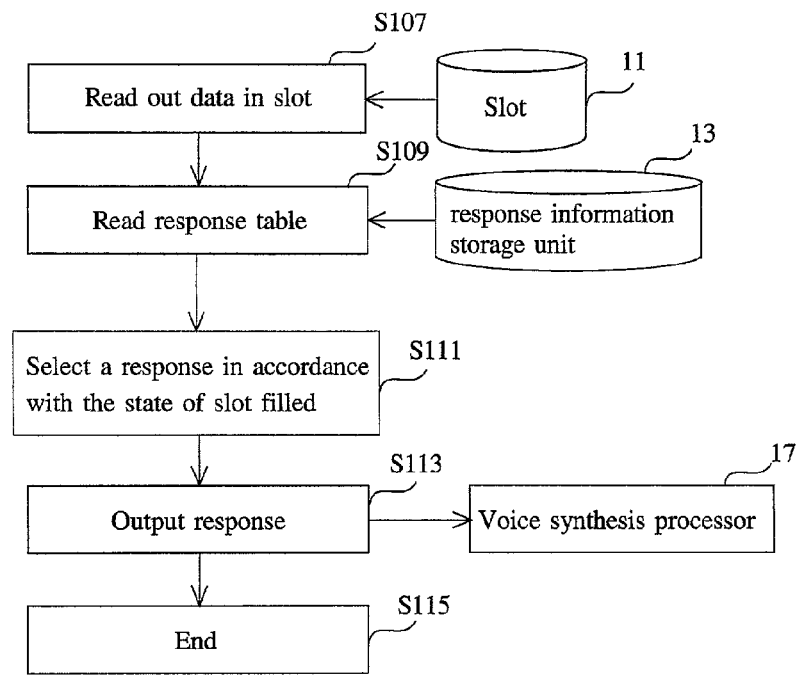
FIG. 9 is a flowchart for response selection processing in the dialogue system in the preferred embodiment of the present invention.

Next, selection of the response in FIG. 2 (step S9) will be explained. FIG. 9 is a flowchart showing the flow of processing that relates to this response selection. Firstly, the information stored in the slot 11 is read (step S107). The response table from the response information storage unit 13 is also read (step S109). Note that the execution order of the steps S107 and S109 can be reversed. A plurality of combinations of slot statuses and responses are recorded in this response table. The dialogue processor 21 selects a response based on the information read from the slot 11, that is, selects a response from the response table in accordance with the state of slots being filled (step S111). The dialogue processor 21 then outputs the character string information for the selected response to the voice synthesis processor 17 (step S113). This character string information is converted into voice information in the voice synthesis processor 17 and transmitted via a telephone line to the speaker 1. Then, this sequence of processing for response selection ends (step S115).

Figure 10:
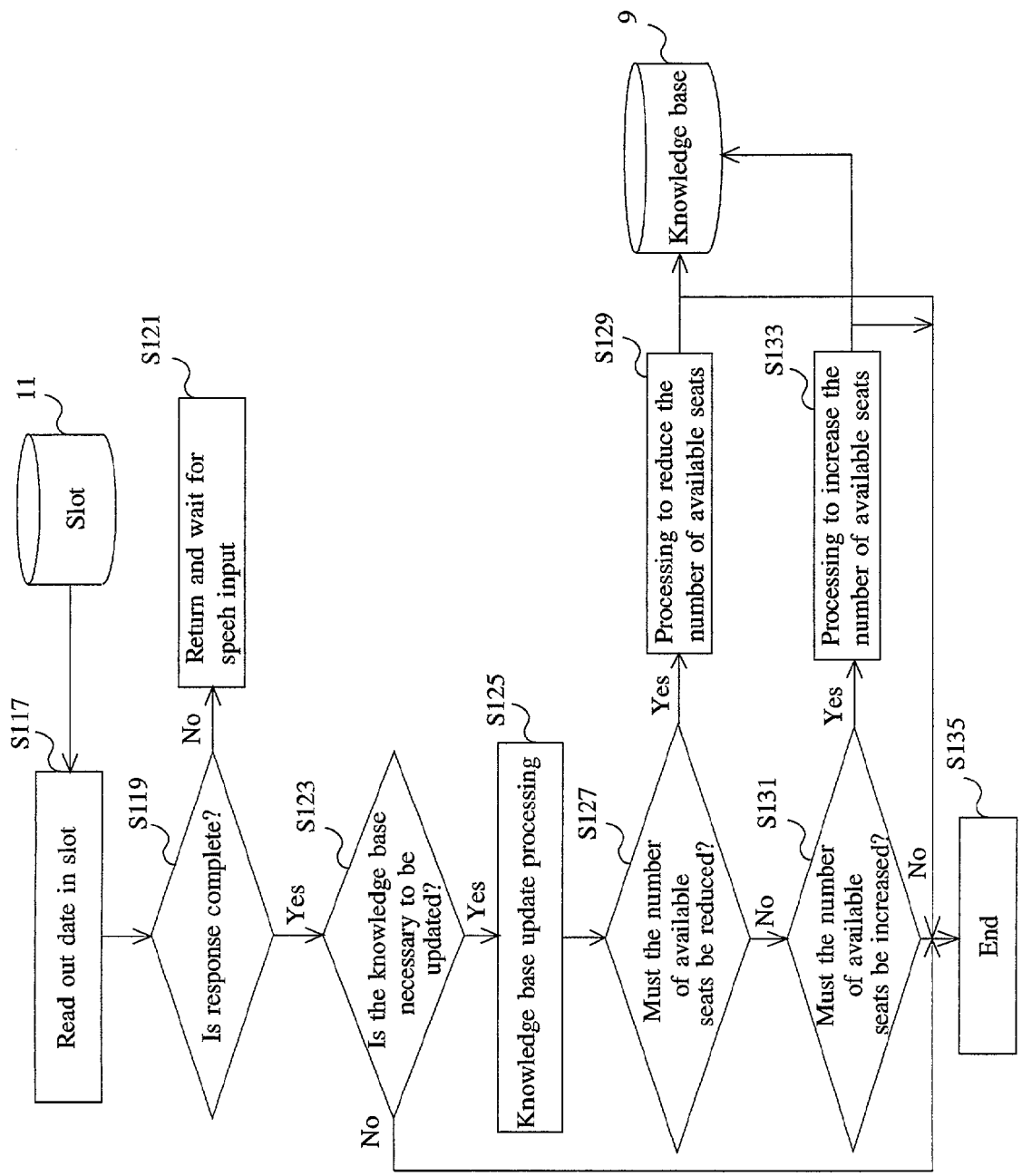
FIG. 10 is a flowchart for slot analysis and knowledge base update processing in the dialogue system in the preferred embodiment of the present invention.

Next, the details of the slot analysis and knowledge base update processing in FIG. 2 (steps S11 through S15 in FIG. 2) will be explained using FIG. 10. Firstly, the knowledge base processor 23 reads information stored in the slot 11 (step S117). The knowledge base processor 23 then determines whether or not the dialogue has finished based on the read information (step S119). If it determines that the dialogue has not finished, it waits for speech input (step S121). In other words, processing moves to the speech receiving step (step S3) in FIG. 2. If it determines that the dialogue has finished, it determines whether or not the knowledge base needs to be updated (step S123). Processing ends if it judges that the knowledge base need not be updated (step S135).

If the knowledge base processor 23 judges that the knowledge base 9 needs be updated, it executes processing to update the knowledge base 9 (step S125). In the knowledge base update processing in this example, the knowledge base processor 23 first determines that the number of available seats must be reduced (step S127). In other words, an airline ticket reservation has been executed by information stored in the slot 11 and then, the knowledge base processor 23 judges that the number of available seats must be reduced by the number of tickets just reserved. If the number of available seats must be reduced, processing is executed to reduce the number of available seats for the flight for which reservations have been received (step S129). The result of the processing to reduce the number of available seats is reflected in the information relating to available seats in the knowledge base 9.

If there is no need to reduce the number of available seats, the knowledge base processor 23 determines whether or not there is a need, conversely, to increase the number of available seats (step S131). The number of available seats may need to be increased if, for example, a reservation is cancelled. If the knowledge base processor 23 determines that the number of available seats needs to be increased, it executes processing to increase the number of available seats (step S133). The processing to increase the number of available seats is executed for the knowledge base 9. Processing ends if the knowledge base processor 23 judges that there is no need to increase the number of available seats (step S135).

The specific configuration of the knowledge base 9 will be explained next. FIG. 11 is an example of a knowledge base relating to airline ticket reservations. FIG. 11 shows information about flights departing from Haneda airport between 1000 hours and 1850 hours on June 5. This information includes date, departure time, departure point, destination, flight name, and available seat information. In its actual operation, in addition to information relating to Haneda as a departure point, information of flights departing from various airports is included. In this knowledge base 9, the date, time, departure point, destination, and flight name information are linked and so, for example, if a flight name is specified, the departure times, departure points, and destination information can be retrieved. Also, because the number of available seats is given for each flight, if the dialogue system 100 in the embodiment of the present invention is used to reserve an air ticket or to cancel a reservation, the number of available seats can be either reduced or increased.

Next, an example of a response table will be explained using FIG. 12. FIG. 12 is divided into a column relating to the slot status and a column for responses. Information such as date, flight, departure point, and destination can be set in the slot status column. The parts in this figure marked with "O" refer to a status in which information has been set in the slot. The parts marked with "X" refer to a status in which information has not been set in the slot.

If no information has been set, the system is configured to output a response saying, "Please specify the flight you would like to board." The system is also configured so that a response stating, "Please specify your destination," will be output if only the date information is set, and a response stating, "Please specify your departure point and destination," will be output when a date and flight have been set. Note, however, that if a script such as that described above is used, and if the date and flight name information is set, a response statement need not be prepared. The system is further configured so that a response stating, "Please specify your departure point," will be output if the date and destination are specified. If all four items of information are set, a response stating, "Thank you for your reservation," will be output. Responses are also specified according to slot status. As described above, responses contain a question that will lead to a status whereby the necessary information will be finally collected and the slot 11 filled with the information. The response given here is just one example and responses may be expressed in a variety of ways.

Next, the internal status of the dialogue system 100 and the sequence of contents of the dialogue in the embodiment of the present invention will be explained with reference to Fi. 13. FIG. 13 shows the speaker, dialogue contents, slot status, and notes. The speaker column shows which dialogue system 100 or the speaker 1 is speaking (or processing).

Firstly, when the speaker 1 uses a telephone to call and say "I would like to make a flight reservation," that information is delivered to the dialogue system 100. The dialogue system 100 analyzes the information in this speech information in the dialogue details analyzer 19 of the dialogue manager 5. If the dialogue system 100 can do things other than make flight reservations (for example, if it can cancel reservations), information indicating the speaker's request is a flight reservation will be stored in a slot not shown in this FIG. 3. No information will be stored in the slot if the system does not handle anything other than flight reservations. In FIG. 13, "-" shows that no entry has been made and "x" shows the status in which the dialogue system 100 recognizes that there is no information. The dialogue processor 21 selects a response stating, "Please specify the flight you would like to board," from the response information storage unit 13 based on analysis results. This response is then sent to the speaker 1. At this time, the dialogue system 100 recognizes that there is no information in the slot 11 as shown n FIG. 13 and, then outputs the response.

In response to this, if the speaker 1 says, "I would like to go to Fukuoka on June 6," the speech details analyzer 19 extracts information representing that the date, that is the boarding date, is "June 6" and that the destination is "Fukuoka". The "June 6" and "Fukuoka" information is then stored in the respective storage areas relating to date information (date slot) and destination information (destination slot). The dialogue processor 21 refers to the information in this slot 11, selects a response from the response information storage unit 13, and outputs this to the voice synthesis processor 17. In this case, a response stating, "Please specify your departure point," is selected.

If the speaker 1 enters, "I would like a flight leaving Tokyo in the morning," the speech details analyzer 19 in the dialogue system 100 extracts that the departure point is "Tokyo" and stores this in the storage area in the slot 11 relating to the departure point (departure point slot). It also extracts the information "in the morning" and the knowledge base processor 23 analyzes the knowledge base 9 with "in the morning". Based on information stored in the slot 11 so far, the system recognizes that the flight is to depart Tokyo for Fukuoka during the morning of June 6. Then, information from the knowledge base 9 representing that there is only one flight fulfilling these requirements and departing at 1100 hours is acquired. Based on the acquired information, information representing that the flight is the one departing at 1100 hours is stored in the flight name storage area (flight slot) of the slot 11. The dialogue processor 21 selects the response stating, "There is an 11 am flight," in accordance with the information stored in the slot 11, and outputs this to the speaker 1. If the speaker 1 enters, "That will be fine," in response, the dialogue system 100 outputs a response, "Thank you very much," and ends the sequence of dialogue processing. It is also possible to provide another slot that stores the fact that a confirmation of reservation has been received, and if information is stored in this slot, a response stating, "Thank you for very much" may be output. Furthermore, the system can be configured so that after confirmation that information has been recorded into the slot for recording the fact that a reservation has been confirmed, update processing for the knowledge base 9, that is processing to reduce the number of available seats, is executed.

In the example shown in FIG. 13, "in the morning" information was entered and now the processing for this will be further explained. The information "in the morning" differs from date information in that it has a time-space range. Therefore, a response using just the extraction rules is not possible and a check must be made to the knowledge base 9. Here, an example is shown where extraction rules and a script for analyzing the knowledge base and updating the slot are prepared. To simplify explanations, the flight slot shown in FIG. 13 is not used and another range slot, which is the storage area for storing the information relating to the time range known as "in the morning," is prepared. In the actual implementation of a dialogue system 100, it is necessary to limit the number of slots as much as possible. This is to prevent an explosion in the number of possible response patterns. Accordingly, the flight slot could also be shared with the range slot as shown in FIG. 13. In this kind of situation, the following extraction rule could be used.

TABLE 10 if (Morph ("in the morning") = TRUE)
    Slot (range) ← "in the morning"
endif

This extraction rule specifies processing for storing information "in the morning" in the range slot of the slot 11 if the morpheme is "in the morning".

Furthermore, in knowledge base analysis and slot update processing, processing on these contents of slot 11 is executed with the following script.

TABLE 11 if (Slot (range) = "in the morning")
    Slot (candidate) ← Knowledge (list | Slot (date), Slot (departure point), Slot (destination), first departure to 1200 hours)
endif This script shows that if information "in the morning" is stored in the range slot of slot 11, the knowledge in knowledge base 9 is used in the processing to store the list of information fulfilling the requirements relating to the date, departure point, destination, and departure times from the first departure to 1200 hours found in slot 11 in the storage area for candidates in slot 11 (candidate slot). Thus, if the time range is defined in Slot (range), a time range, as well as date, departure point, and destination elements can be defined and referred to. This enables a list of relevant flights to be given in the Slot (candidates).

By setting a response asking, "There are "Slot (candidate)" flights available. Which would you prefer?" for this list, the speaker 1 can be made to select the flight they prefer from the list of possible flights. The area enclosed by """" refers to information itself stored in the slot.

Now FIG. 14 will be used to further explain the sequence of the contents of a dialogue and the internal status of the dialogue system 100 that relates to the embodiment of the present invention. The speaker column does not contain simply the source of the call but also the processing entity. If the speaker 1 first makes a call on the telephone to say, "I would like to make a flight reservation," that information is delivered to the dialogue system 100. The dialogue processor 21 selects from the response information storage unit 13 the response "Please specify the flight you would like to board," based on the results of analysis by the speech details analyzer 19, and outputs the response to speaker 1 via the voice synthesis processor 17.

When the speaker 1 says, "I would like to go to Fukuoka," the speech detail analyzer 19 extracts information that the destination is "Fukuoka", and the information "Fukuoka" is then stored in the destination slot of slot 11. The dialogue processor 21 refers to the information in the slot 11, selects a response from the response information storage unit 13, and outputs it. In this case, a response "When would you like to board the flight?" will be selected.

When the speaker 1 enters "Tomorrow morning, please" in response to this, the speech details analyzer 19 in the dialogue system 100 extracts the date "tomorrow" and stores this in the storage area for the date in slot 11. To complete the reservation, this information "tomorrow" must be converted to an absolute value. To do this, the date information of the dialogue is acquired from the timer in the dialogue system 100 and that value of the date information is changed into that value plus one day. This is stored in the date slot of slot 11. In this example, the date of the dialogue is the 7-th and so the 8-th, which is 7+1, is stored in the date slot.

Here, the speech details analysis if information "tomorrow" has been entered will be explained. The processing here is executed in accordance with the following extraction rule.

TABLE 12 if (Morph ("tomorrow") = TRUE)
    Slot (date) ← Date ("today" + 1)
endif

This shows the processing wherein date information, in which 1 is added to the current date, is store in the date slot of slot 11 if tomorrow is the morpheme.

The extraction rule for "the day after tomorrow" is shown below.

TABLE 13 if (Morph ("the day after tomorrow") = TRUE)
    Slot (date) ← Date ("today" + 2)
endif Also, for information extracted as "in the morning", the knowledge base processor 23 analyzes the knowledge base and updates the slots. In order to show the flights from the dialogue system 100 to the speaker 1, the system 100, then, recognizes that a departure point must be specified. Therefore, the dialogue processor 11 selects the response "Please specify your departure point" from the response information storage unit 13 and outputs this to the speaker 1. If the speaker 1 enters "I would like a flight departing from Tokyo", information is extracted in the speech details analyzer 19 and the information "Tokyo" is stored in the departure point slot in slot 11.

Based on the information stored in slot 11 acquired thus far, it is recognized that the flight that the speaker 1 is attempting to reserve is the flight departing in the morning on June 8 from Tokyo and going to Fukuoka. Therefore, the knowledge base processor 23 searches the knowledge base 9 and acquires information that the only flight fulfilling all requirements is one departing at 1100 hours. The acquired information is stored in the flight name slot in slot 11. Then, in accordance with the information stored in slot 11, the dialogue processor 21 selects a response stating, "There is a flight departing at 11 o'clock," and outputs this to the speaker 1. If the speaker 1 responds with, "That will be fine," the dialogue system 100 outputs a response "Thank you very much" and ends the sequence of dialogue processing.

In the dialogue system 100 in the embodiment of the present invention, the necessary information is recorded in slots and response information is selected based on the status of those slots. Therefore, even if some of the necessary information recorded in a slot changes, there is no need to re-enter all the necessary information. For example, from the initial speech in the flight reservation system, it is easy to change from "Narita Airport," which is the first input, to "Haneda Airport".

In the above example, the speaker 1 entered information by voice into the dialogue system 100 but this is not the only means of input possible. The speaker 1 can also enter information by typing character string information using a keyboard connected to the dialogue system 100 or can send character string information via e-mail.

The function block diagram shown in FIG. 1 is one example and it is also possible to integrate a plurality of blocks into one and to divide one block into a plurality of blocks.

Furthermore, the dialogue system 100 described above can also be configured by installing a program for a dialogue system onto a computer. Here, the program would be stored on a storage medium or storage device such as a floppy disk, CD-ROM, a magneto-optical disk, semi-conductor memory, or hard disk. The results of interim processing would temporarily be stored in memory.

The present invention has thus enabled a dialogue processing system with a simple configuration to realize natural dialogue.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. A dialogue processing system for performing a natural language dialogue with a user, comprising:
   a predetermined number of slots, each said slot being a storage area for storing one predefined information item which is required to perform a processing for a service requested by said user;
   an analyzer extracting information corresponding to said information item from information entered by a certain user in said one dialogue and storing the extracted information in the slot for the information item;
   a knowledge base storing information relating to said predefined information items, and
   a response processor determining whether said one dialogue is completed based on whether all of said information items required to perform said processing for said service requested by said user have been stored into all of said predetermined number of slots, and outputting response information to said certain user in accordance with an information storage state of said slots
   wherein said response processor comprises a checker that checks whether there is inconsistency between information stored in said slots and information stored in said knowledge base by using said information stored in said slots and said information stored in said knowledge base, and
   wherein progress of said one dialogue is controlled based on said information storage state of said predetermined number of slots without using any dialogue sequence definition.

2. The dialogue processing system as set forth in claim 1, further comprising:
   a knowledge base processor extracting information corresponding to information items required to perform said processing for said service requested by said user with said certain user by using information stored in said slots and information stored in said knowledge base and storing the extracted information in the slot for the required information item.

3. The dialogue processing system as set forth in claim 1, wherein said information entered by said certain user in said one dialogue is a sentence in natural language, and
   wherein said analyzer comprises:
   means for performing morpheme analysis for said sentence;
   means for performing parsing processing for results of said morpheme analysis; and
   means for extracting information corresponding to the information item based on the results of said morpheme analysis and said parsing processing by using an extraction rule pre-defined to perform said processing for said service requested by said user.

4. The dialogue processing system as set forth in claim 1, further comprising:
   means for determining whether information stored in said knowledge base is necessary to be updated if all said information items required to perform said processing for said service requested by said user with said certain user are stored in all of said predetermined number of slots; and
   means for updating said knowledge base in accordance with a predetermined rule if it is determined that said information stored in said knowledge base is necessary to be updated.

5. The dialogue processing system as set forth in claim 1, wherein said response processor comprises:
   a response information storage device for storing response information for said user in correspondence with said information storage state of said slots; and
   means for determining said information storage state of said slots and for acquiring and outputting response information for said certain user in correspondence with said information storage state of said slots from said response information storage device.

6. The dialogue processing system as set forth in claim 1, wherein said information entered by said certain user in said one dialogue is voice information entered in natural language, and wherein said dialogue processing system further comprises:
a voice recognition processor for converting said voice information into character information; and
a voice synthesis processor for converting said response information into voice information.

7. The dialogue processing system as set forth in claim 1, wherein, in accordance with said information storage state of said slots, said response processor outputs response information for requesting said certain user to enter information items that are required to perform said processing for a service requested by said user.

8. A storage medium for storing a program for processing a natural language dialogue with a user, said program configured to perform a process, the process comprising:
ensuring a predetermined number of slots on a storage device, each said slot being a storage area for storing a predefined information item which is required to perform a processing for a service requested by said user;
extracting information corresponding to said information item from information entered by a certain user in said one dialogue and storing the extracted information in the slot for the information item;
a knowledge base storing information relating to said predefined information items, and
determining whether said one dialogue is completed based on whether all of said information items required to perform said processing for said service requested by said user have been stored into all of said predetermined number of slots, and outputting response information to said certain user in accordance with an information storage state of said slots, and
wherein said response processor comprises a checker that checks whether there is inconsistency between information stored in said slots and information stored in said knowledge base by using said information stored in said slots and said information stored in said knowledge base, and
wherein progress of said one dialogue is controlled based on said information storage state of said predetermined number of slots without using any dialogue sequence definition.

9. The storage medium as set forth in claim 8, said process further comprising:
extracting information corresponding to information items required to perform said processing for said service requested by said user with said certain user by using information stored in said slots and information stored in a knowledge base relating to said dialogue with said user; and
storing the extracted information in the slot for the required information item.

10. The storage medium as set forth in claim 8, said process further comprising:
checking whether there is inconsistency between information stored in said slots and information stored in a knowledge base relating to said dialogue with said user by using said information stored in said slots and said information stored in said knowledge base.

11. The storage medium as set forth in claim 8, wherein said information entered by said certain user in said one dialogue is a sentence in natural language, and wherein said extracting comprises:
performing morpheme analysis for said sentence;
performing parsing processing for results of said morpheme analysis; and
extracting information corresponding to the information item based on the results of said morpheme analysis and said parsing processing by using an extraction rule pre-defined to perform said processing for said service requested by said user.

12. The storage medium as set forth in claim 8, said process further comprising:
determining whether information stored in a knowledge base relating to said dialogue with said user is necessary to be updated if all said information items required to perform said processing for said service requested by said user with said certain user are stored in all of said predetermined number of slots; and
updating said knowledge base in accordance with a predetermined rule if it is determined that said information stored in said knowledge base is necessary to be updated.

13. The storage medium as set forth in claim 8, wherein said determining and outputting comprises:
determining said information storage state of said slots; and
acquiring and outputting response information for said certain user in correspondence with said information storage state of said slots from a response information storage device for storing response information for a user in correspondence with said information storage state of said slots.

14. The storage medium as set forth in claim 8,
wherein said information entered by said certain user in said one dialogue is voice information entered in natural language, and
wherein said process further comprises:
converting said the voice information into character information; and
converting said response information into voice information.

15. The storage medium as set forth in claim 8, wherein, in accordance with said information storage state of said slots, said outputting comprises outputting response information for requesting said certain user to enter information items that are required to perform said processing for a service requested by said user.

16. A method for processing a natural language dialogue with a user, said method comprising:
ensuring a predetermined number of slots on a storage device, each said slot being a storage area for storing a predefined information item which is required to perform a processing for a service requested by said user;
extracting information corresponding to said information item from information entered by a certain user in said one dialogue and storing the extracted information in the slot for the information item;
a knowledge base storing information relating to said predefined information items, and
determining whether said one dialogue is completed based on whether all of said information items required to perform said processing for a service requested by said user have been stored into all of said predetermined number of slots, and outputting response information to said certain user in accordance with an information storage state of said slots, and wherein said response processor comprises a checker that checks whether there is inconsistency between information stored in said slots and information stored in said knowledge base by using said information stored in said slots and said information stored in said knowledge base, and wherein progress of said one dialogue is controlled based on said information storage state of said predetermined number of slots without using any dialogue sequence definition.

17. The method as set forth in claim 16, further comprising:
   extracting information corresponding to information items required to perform said processing for said service requested by said user with said certain user by using information stored in said slots and information stored in a knowledge base relating to said dialogue with said user; and
   storing the extracted information in the slot for the required information item.

18. The method as set forth in claim 16, further comprising:
   checking whether there is inconsistency between information stored in said slots and information stored in a knowledge base relating to said dialogue with said user by using said information stored in said slots and said information stored in said knowledge base.

19. The method as set forth in claim 16, wherein said information entered by said certain user in said one dialogue is a sentence in natural language, and
   wherein said extracting comprises:
   performing morpheme analysis for said sentence;
   performing parsing processing for results of said morpheme analysis; and
   extracting information corresponding to the information item based on the results of said morpheme analysis and said parsing processing by using an extraction rule pre-defined to perform said processing for said service requested by said user.

20. The method as set forth in claim 16, further comprising:
   determining whether information stored in a knowledge base relating to said dialogue with said user is necessary to be updated if all said information items required to perform said processing for said service requested by said user with said certain user are stored in all of said predetermined number of slots; and
   updating said knowledge base in accordance with a predetermined rule if it is determined that said information stored in said knowledge base is necessary to be updated.

21. The method as set forth in claim 16, wherein said determining and outputting comprises:
   determining said information storage state of said slots; and
   acquiring and outputting response information for said certain user in correspondence with said information storage state of said slots from a response information storage device for storing response information for a user in correspondence with said information storage state of said slots.

22. The method as set forth in claim 16, wherein said information entered by said certain user in said one dialogue is voice information entered in natural language, and wherein said method further comprises:
   converting said the voice information into character information; and
   converting said response information into voice information.

23. The method as set forth in claim 16, wherein, in accordance with said information storage state of said slots, said determining and outputting comprises outputting response information for requesting said certain user to enter information items that are required to perform said processing for a service requested by said user.

24. A method of processing a natural language dialogue with a user, the method comprising:
   providing a predetermined dialog objective, the predetermined dialog objective comprising a set slots of information, each slot comprising a specific field of information that needs to be filled to complete the dialog objective;
   preparing or selecting natural language prompts to be presented to the user, where the prompts are prepared or selected based on which slots have filled fields and which do not;
   storing information relating to said predefined information items in a knowledge base, and
   receiving sentence-like natural language responses to the natural language prompts and, for each response, using natural language processing to automatically extract one or more fields of information that the user intended to convey with the response, where, for at least one received response, two different fields are extracted and determined to correspond to slot fields, where at least one of the extracted fields was supplemental information volunteered from the user without having been previously specifically prompted for by a prompt prepared or selected to be presented to the user, whereby progress of the natural language dialogue is controlled based on the information storage state of the predetermined number of slots without reference to any dialogue sequence definition.

25. A method according to claim 24, further comprising:
   allowing a dynamic order of presenting the prompts to the user.

26. A method according to claim 24, further comprising:
   given a slot previously mentioned during the dialog, allowing the user or a system preparing the prompts to use a pronoun to refer to the previously mentioned slot, where, for some later response having the pronoun, the system automatically determines which slot is referred to by the pronoun in the later response.

27. A method according to claim 24, further comprising:
   automatically determining that the dialog objective has been met when all of the slot fields are filled.

* * * * *